United States Patent [19]
Horii

[11] Patent Number: 5,454,723
[45] Date of Patent: Oct. 3, 1995

[54] KARAOKE APPARATUS AND METHOD FOR MEDLEY PLAYBACK

[75] Inventor: Kazutugu Horii, Tokyo, Japan

[73] Assignee: Pioneer Electronic Corporation, Tokyo, Japan

[21] Appl. No.: 172,565

[22] Filed: Dec. 22, 1993

[30] Foreign Application Priority Data

Dec. 28, 1992 [JP] Japan ............................ 4-348570

[51] Int. Cl.$^6$ ...................... G09B 5/00; G09B 15/04
[52] U.S. Cl. .................... 434/307 A; 434/307 R; 434/318; 84/477 R; 84/601; 360/32; 358/342; 348/484
[58] Field of Search ............. 434/307 R, 307 A, 434/308, 309, 318, 365; 84/454, 477 R, 601–604, 609, 615, 645; 369/32, 48, 50, 70, 134, 178, 192; 360/32, 33.1, 77.01; 358/310, 335, 341, 342; 395/154, 160, 625, 141, 143, 147; 348/476, 678, 571, 595, 738

[56] References Cited

U.S. PATENT DOCUMENTS

| | | | |
|---|---|---|---|
| 5,046,004 | 9/1991 | Tsumura et al. | 84/601 |
| 5,131,311 | 7/1992 | Murakami et al. | 358/342 X |
| 5,208,679 | 5/1993 | Yamauchi et al. | 358/342 |
| 5,233,438 | 8/1993 | Funahashi et al. | 358/342 X |
| 5,247,126 | 9/1993 | Okamura et al. | 84/609 |
| 5,250,747 | 10/1993 | Tsumura | 358/342 X |
| 5,286,907 | 2/1994 | Okamura et al. | 84/601 |
| 5,321,200 | 6/1994 | Yamamoto | 84/645 |
| 5,335,073 | 8/1994 | Yamamoto | 348/738 |

FOREIGN PATENT DOCUMENTS

| | | |
|---|---|---|
| 0488732 | 6/1992 | European Pat. Off. . |
| 0509766 | 10/1992 | European Pat. Off. . |
| 4190397 | 7/1992 | Japan . |

*Primary Examiner*—Richard J. Apley
*Assistant Examiner*—Joe H. Cheng
*Attorney, Agent, or Firm*—Kane, Dalsimer, Sullivan, Kurucz, Levy, Eisele and Richard

[57] ABSTRACT

A karaoke apparatus for medley playback includes: playback unit for receiving playback information including MIDI sound source control information and producing acoustic sound of karaoke song on the basis of the playback information; information storage unit for storing playback information and identification information of a plurality of karaoke songs, the identification information specifying playback information of a highlight portion of each of the plurality of karaoke songs; selection instructing unit for instructing a selection of karaoke songs to be played; and playback control unit for reading out playback information of the highlight portions of the songs selected by the selection instructing unit from the information storage unit on the basis of the identification information of the each of the selected karaoke songs, and controlling the playback unit to successively play the selected karaoke songs on the basis of the playback information of the selected karaoke songs to produce a medley of the selected karaoke songs.

17 Claims, 10 Drawing Sheets

FIG. 3

```
                                    26
                                   /
┌─────────────────────────────────────┐
│                                     │
│          STORAGE UNIT               │
│                                     │
│                                     │
├─────────────────────────────────────┤
│  MIDI KARAOKE DATA                  │
│   ┌─────────────────────────────┐   │
│   │ SEQUENCE DATA               │   │
│   │  ┌────────────────────────┐ │   │
│   │  │ NOTE DATA/SONG DATA    │ │   │
│   │  │    ┌─────────────────┐ │ │   │
│   │  │    │  INDEX DATA     │ │ │   │
│   │  └────┴─────────────────┘ │ │   │
│   │  │ WORD-OF-SONG DATA      │ │   │
│   │  ├────────────────────────┤ │   │
│   │  │ PCM DATA               │ │   │
│   │  ├────────────────────────┤ │   │
│   │  │ IMAGE                  │ │   │
│   │  │ /LIGHTING CONTROL DATA │ │   │
│   │  └────────────────────────┘ │   │
└─────────────────────────────────────┘
```

J₁ : JUMP START STATUS

J₂ : JUMP END STATUS

KARAOKE APPARATUS AND METHOD FOR MEDLEY PLAYBACK

BACKGROUND OF THE INVENTION

1. Field of the Invention

This invention relates to a karaoke apparatus for medley playback capable of successively playing highlight portions of a plurality of songs, and more particularly to a karaoke apparatus for medley playback which plays karaoke music utilizing playback information including control information according to MIDI (Musical Instrument Digital Interface) standard.

2. Description of the Prior Art

There is known a karaoke apparatus which reads out information from Compact Disk, Laser Video Disk or the like and plays instrumental music as an accompaniment for a singer. In addition, there is known a MIDI karaoke apparatus which stores playback information including MIDI sound source control information according to MIDI standard, and controls the MIDI sound source to play a so-called karaoke music. The MIDI standard is a rule for interchanging information between musical instruments such as a synthesizer, an electric piano or the like. The above karaoke apparatus plays various kind of songs, and recently many people sing so-called "medley (omnibus) karaoke song". The medley karaoke song is a medley of some portions of a plurality of songs. Highlight portions of a plurality of songs, including popular phrases or melodies and lasting for about 30 to 60 seconds, are played in succession to form one medley karaoke song. Conventionally, such medley karaoke songs are produced by a professional producer in consideration of genre or composer of the songs and recorded in disk recording media or the like to be put on the market. Accordingly, the combination of musical portions of such a medley karaoke song depends upon the producer's selection and user cannot alter the combination to make a medley of his or her favorite songs. In view of this, it is desired to make a medley of user's favorite songs regardless of the genre or composer of the songs.

SUMMARY OF THE INVENTION

It is an object of the present invention to provide a karaoke apparatus for medley playback by which user can easily select his or her favorite songs and make a medley karaoke song of the favorite songs.

According to one aspect of the present invention, there is provided a karaoke apparatus for medley playback including: playback unit for receiving playback information including MIDI sound source control information and producing acoustic sound of karaoke song on the basis of the playback information; information storage unit for storing playback information and identification information of a plurality of karaoke songs, the identification information specifying playback information of a highlight portion of each of the plurality of karaoke songs; selection instructing unit for instructing a selection of karaoke songs to be played; and playback control unit for reading out playback information of the highlight portions of the songs selected by the selection instructing unit from the information storage unit on the basis of the identification information of the each of the selected karaoke songs, and controlling the playback unit to successively play the selected karaoke songs on the basis of the playback information of the selected karaoke songs to produce a medley of the selected karaoke songs.

According to another aspect of the present invention, there is provided a karaoke apparatus for medley playback including: information storage unit for storing digital music data including song data of a plurality of karaoke songs, each of the song data including music data and identification data specifying a highlight portion of the music data; selection instruction unit for instructing a selection of karaoke songs to be played; medley karaoke data generation unit for reading out the identification data of the songs selected by the selection instruction unit from the information storage unit in an order of the selection of the songs and combining the music data of the highlight portions of the selected songs each specified by the identification data to produce a successive music data of the selected songs; medley karaoke data storage unit for storing the successive music data of the selected songs as a medley karaoke data; and playback unit for receiving the medley karaoke data and producing acoustic sound of karaoke song on the basis of the medley karaoke data.

According to still another aspect of the present invention, there is provided a method of medley playback of karaoke songs using an omnibus karaoke apparatus including the steps of: storing digital music data including song data of a plurality of karaoke songs, each of the song data including music data and identification data specifying a highlight portion of the music data; instructing a selection of karaoke songs to be played in medley; reading out the music data of highlight portions of the selected songs with reference to the identification data; combining the music data of the highlight portions read out to form a successive music data of the selected songs; storing the successive music data of the selected songs as a medley karaoke data; and producing acoustic sound of karaoke song on the basis of the medley karaoke data.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a diagram showing a distribution of MIDI karaoke data;

DESCRIPTION OF THE PREFERRED EMBODIMENT

Fundamental Concept

Before describing details of a preferred embodiment, the fundamental concept of the present invention will be firstly described below.

Figure 1:
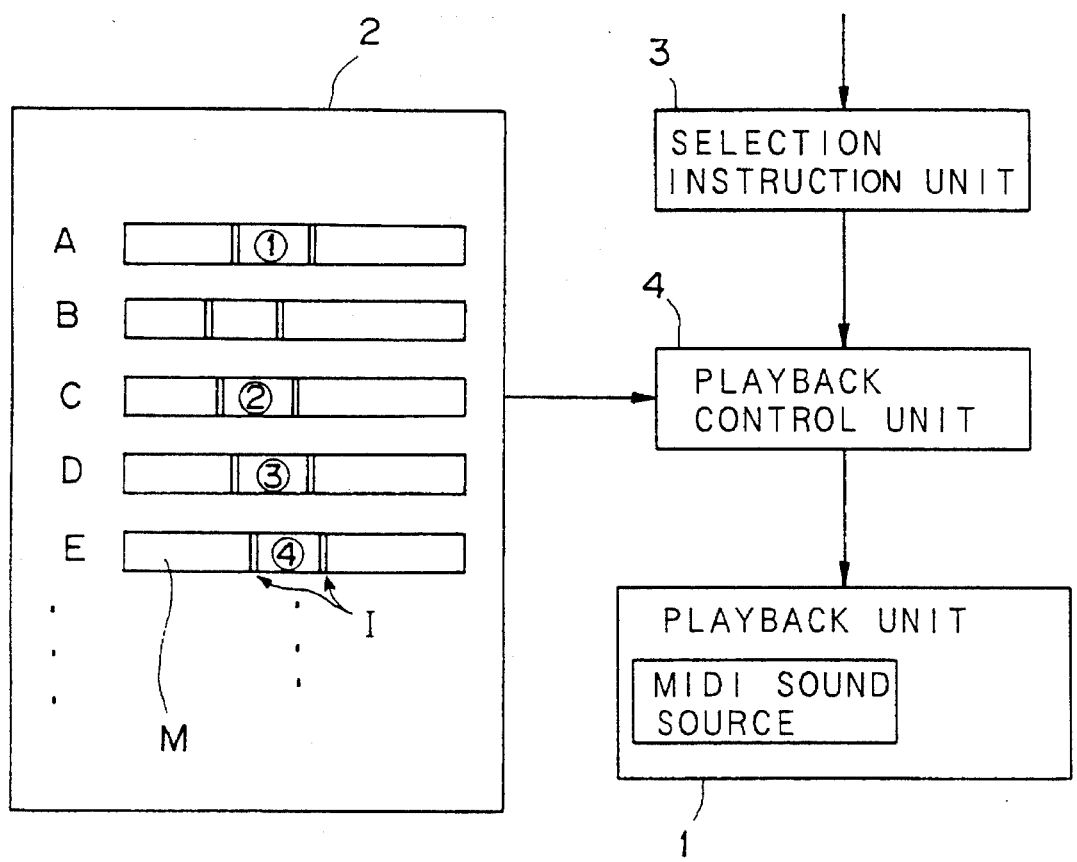
FIG. 1 is a diagram showing a fundamental concept of the present invention.

FIG. 1 shows a fundamental concept of the present invention. As shown in FIG. 1, a karaoke apparatus according to the present invention includes a playback unit 1, a song information storage unit 2, a selection instruction unit 3 and a playback control unit 4. The playback unit 1 includes a MIDI sound source for receiving control information according to MIDI standard and generating acoustic playback signal to output karaoke songs. The song information storage unit 2 stores playback information and identification information. Playback information includes MIDI sound source control information for controlling the MIDI sound source. Identification information specifies a predetermined portion of playback information of a song. The selection instruction unit 3 receives instruction of selecting songs to be played in medley playback. The playback control unit 4 retrieves and reads out playback information of the predetermined portions of the selected songs from the song information storage unit 2 by referring to identification information, and controls the playback unit 1 in accordance with read-out playback information.

When selection of songs are instructed via the selection instruction unit 3, the playback control unit 4 successively reads out, for each of the selected songs, playback information of the predetermined portions from the song information storage unit 2 by referring to identification information. Assuming now that songs A, C, D and E stored in the song information storage unit 2 are selected as shown in FIG. 1, the playback control unit 4 detects playback information M of the predetermined portions ① to ④ of the respective selected songs with reference to identification information I of the respective songs A, C, D and E. Subsequently, the playback control unit 4 reads out MIDI sound source control information in the playback information of the predetermined portions ① to ④ of the selected songs and successively supplies them to the playback unit 1 to play the predetermined portions of the selected songs in succession.

Embodiment

A preferred embodiment of the present invention will be described below with reference to the accompanying drawings.

Figure 2:
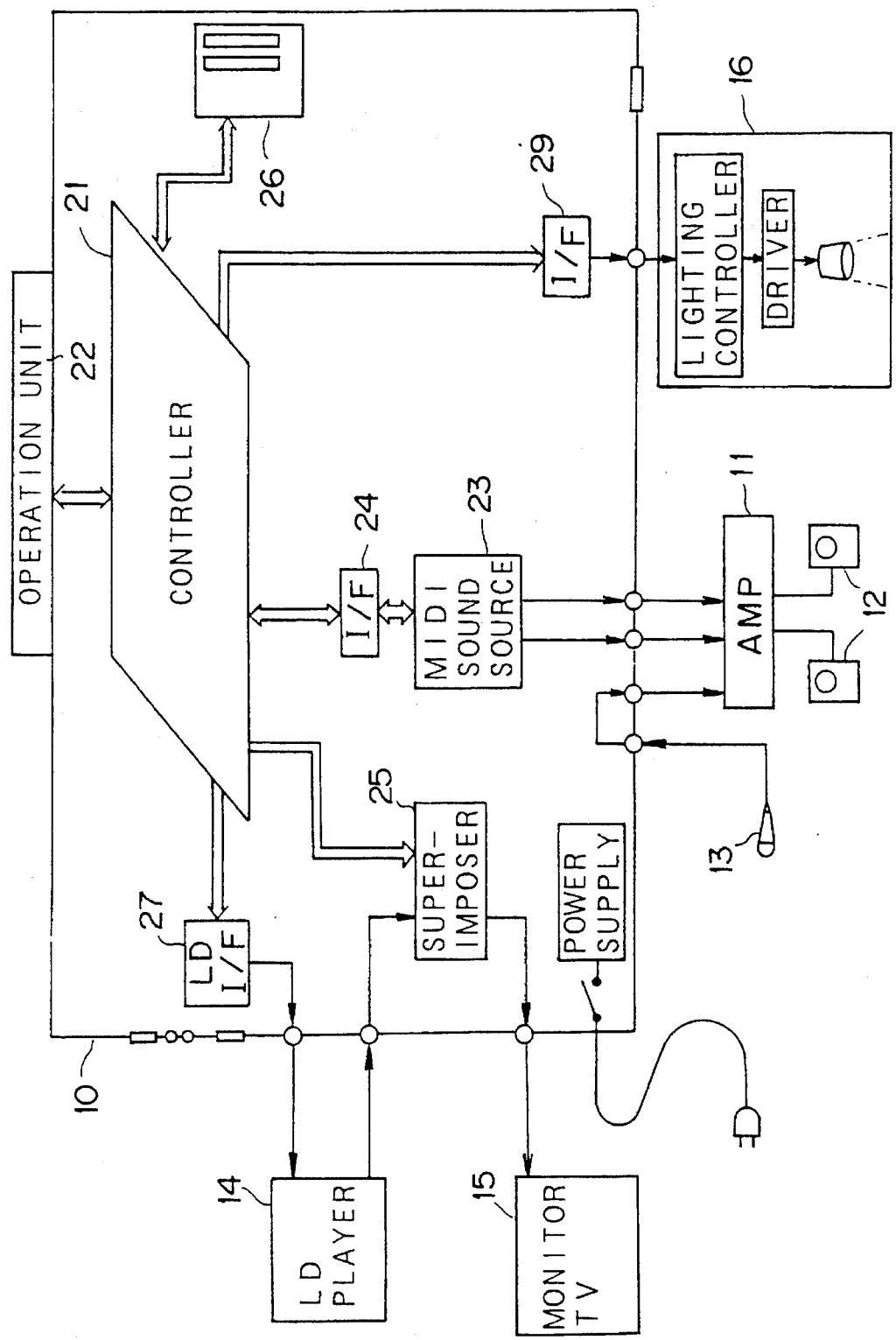
FIG. 2 is a block diagram showing an embodiment of a karaoke apparatus according to the present invention.

FIG. 2 shows a construction of a karaoke apparatus according to an embodiment of the present invention. As shown in FIG. 2, the karaoke apparatus includes a MIDI playback device 10, a mixing amplifier 11, a pair of speakers 12, a microphone 13, an LD (Laser Disk) player 14, a TV monitor 15 and a lighting device 16. The MIDI playback device 10 includes a controller 21 composed of microprocessor for collectively controlling the karaoke apparatus, an operation unit 22 for receiving instruction and displaying necessary information, a MIDI sound source 23 for generating an acoustic playback signal, a MIDI interface 24 for connecting the MIDI sound source 23 and the controller 21, a superimposer 25, a storage unit 26 composed of OMDD (Optical Memory Disk Drive), an LD interface 27 for connecting the controller 21 and the LD player 14, a power supply 28 and a lighting interface 29 for connecting the controller 21 and the lighting device 16.

In the MIDI playback device 10, when the MIDI sound source 23 receives MIDI sound source control information via the MIDI interface 24 under the control of the controller 21, the MIDI sound source 23 supplies acoustic playback signal corresponding to the control information to the mixing amplifier 11, and acoustic sound is output from the speaker 12. The LD interface 27 and the LD player 14 are connected by RS232C connecter to control the image playback in the LD player 14. Image signal reproduced by the LD player 14 is supplied, via the superimposer 25, to the TV monitor 15 to be displayed. The superimposer 25 superimposes image signal of characters or the like input from the controller 21 on the image signal to be displayed on the TV monitor 15. The lighting unit 16 performs lighting under the control of the controller 21.

The LD player 14 reproduces images, prepared being distributed to various genre of the songs, under the control of the controller 21. In a case of using an LD player having an automatic changer of LDs capable of storing images for thousands of songs, images are prepared for each of songs independently and an image corresponding to a song is selected. Alternately, it is possible to prepare images being roughly distributed to a plurality of groups. That is, every songs are distributed to a plurality of genre such as popular, rock or the like, and each of the groups are further distributed to a plurality of sub-groups such as spring, summer, autumn and winter. This sub-groups may be still further divided into groups images of morning, daytime or night, or groups of specific images of a middle of buildings, park, etc. One image out of these image groups is selected. In this case, it is sufficient to prepare only one LD, and therefore the system can be simplified. If various images are prepared utilizing an automatic changer, user may be satisfied.

The storage unit 26 stores, as MIDI karaoke data, playback information including MIDI sound source control information according to MIDI standard. MIDI karaoke data is constituted by data of every song unit and each of them includes MIDI sound source control information for controlling the MIDI sound source 23, word-of-song data, image control data and lighting control data. As shown in FIG. 3, MIDI karaoke data includes sequence data used for playback. Sequence data includes note data, word-of-song data, PCM data and image/lighting control data. Note data includes MIDI sound source control information prepared for every song each including data for specifying tone, interval, tempo and rhythm, etc. Word-of-song data includes index data used for retrieval of songs requested, character data used for telop represented on the TV monitor 15 and timing map data for specifying timing of displaying word-of-songs, speed of changing color of word-of-song display, each of them being prepared for every songs. Index data is arranged at the beginning of word-of-song data. PCM data includes data of sound effect that MIDI sound source cannot produce and data of background chorus, each of them being prepared for every songs. Image/lighting control data includes control data for instructing image reproduction and lighting in correspondence with the progress of song playback.

Index data, arranged at the beginning of word-of-song data, includes data indicating name of song, singer, composer and genre of song, and users select songs by specifying these data. Genre data is used as image instructing data for selecting image suitable for the selected song. It is possible to use, as genre data, number of LD which stores image suitable for the song or number specifying respective images. MIDI karaoke data is approximately of 100 kilobytes for each songs. Details of karaoke file utilizing MIDI karaoke data and karaoke apparatus reproducing MIDI karaoke data are described in U.S. patent application Ser. No. 775,147.

Figure 4A:
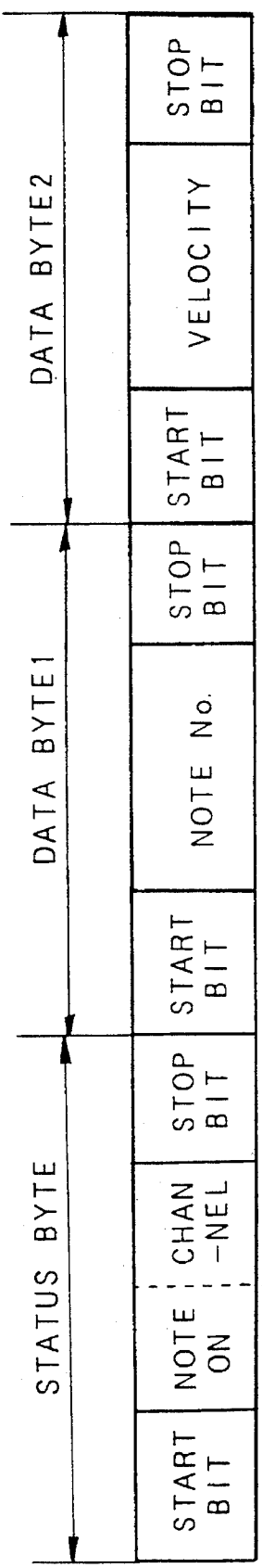
FIGS. 4A and 4B are diagrams showing MIDI sound source control information.
Figure 4B:
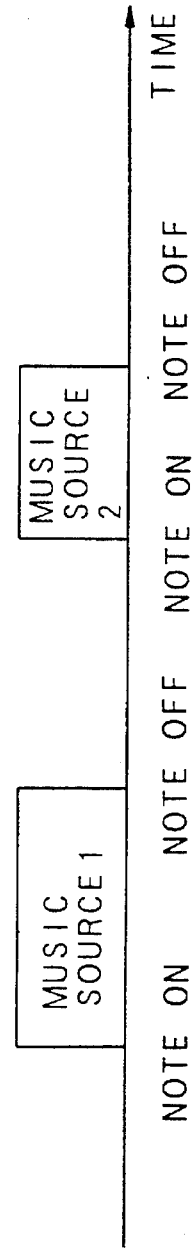

MIDI sound source control information used for controlling the MIDI sound source 23 includes at least one status byte for specifying kinds of control or MIDI channel and one or two data bytes relating to the control specified by the status byte. Status byte and data bytes are combined and transmitted as messages serving as playback information. FIG. 4A shows note-on message which is one of channel voice message. As seen in FIG. 4A, start bit and stop bit are added to each byte and these bytes are converted to a serial data by the MIDI interface 24. The converted data is supplied to the MIDI sound source 23. Note-on message and note-off message, shown in FIG. 4B, are serving as instructions of performances of pushing down keyboard and releasing the push from the keyboard, respectively. Note-on message is used with note-off message as a pair.

Figure 5:
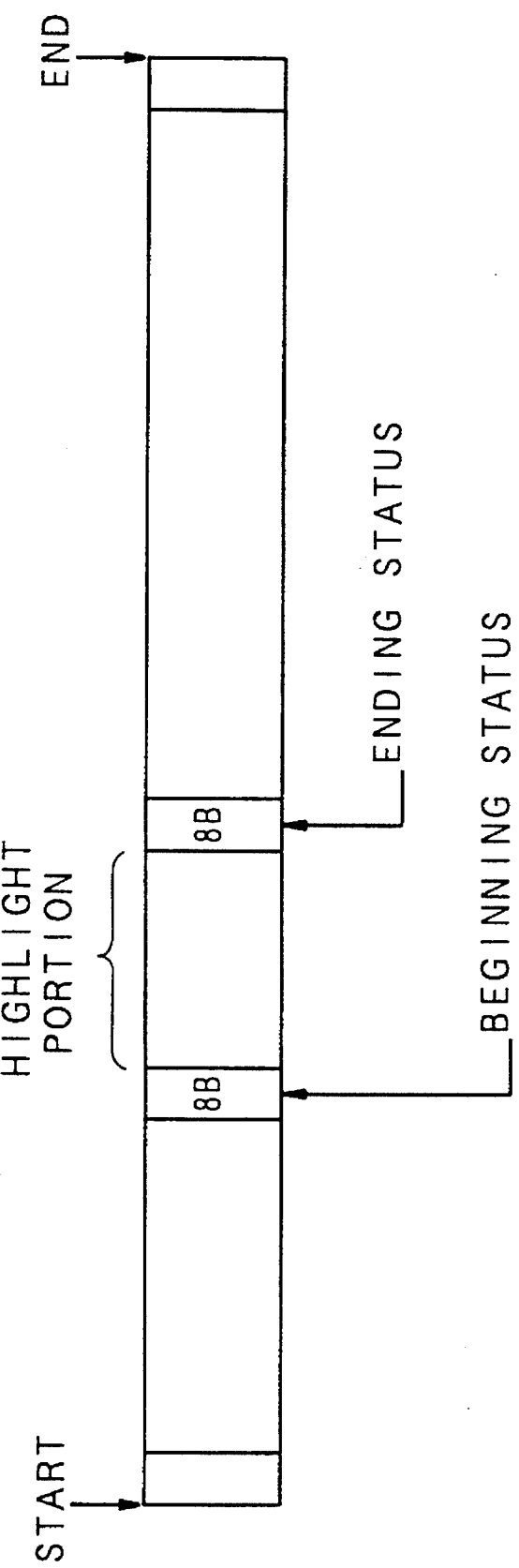
FIG. 5 is a diagram showing an arrangement of identification information.

As shown in FIG. 5, MIDI sound source control information is stored in the storage unit 26 in such a manner that beginning status (8Bh: h indicates hexadecimal number) and ending status (8Ch: h indicates hexadecimal number) are inserted to partition playback information of highlight portion of the song. Highlight portion is a part of song including popular phrases or melodies, for example, and is predetermined for every songs in advance. The beginning status and the ending status are neglected in a normal playback mode, and used as target for detecting the highlight portion of the song in a medley playback mode.

Playback of the above-described karaoke apparatus starts when a selection of songs to be played are instructed via the operation unit 22. When the selection is input, the controller 21 reads out MIDI karaoke data of the selected songs from the storage unit 26 and starts playback control. In the playback control, the controller 21 firstly controls the LD player 14 to reproduce images specified by image instruction information. Simultaneously, the controller 21 transmits MIDI sound source control information to the MIDI sound source 23 to play karaoke song. In addition, the controller 21 transmits data of title of the song and word-of-song to the superimposer 25 in correspondence with playback of karaoke song by referring to timing data in the word-of-song data. Further, the controller 21 superimposes telop onto image reproduced by the LD player 14 and changes color of the telop to represent timing of singing song.

Figure 6:
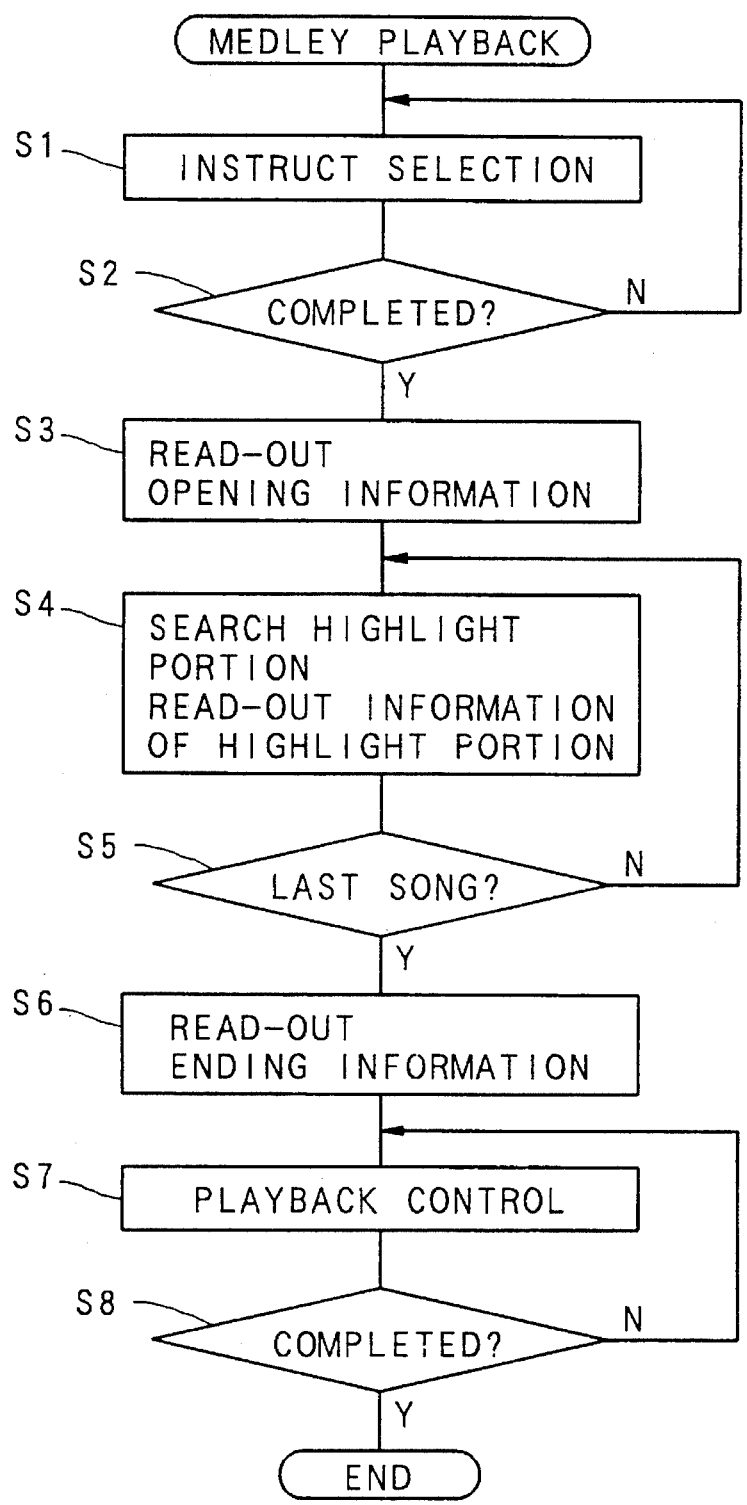
FIG. 6 is a diagram showing an operation of medley playback.

The karaoke apparatus of the present invention performs medley playback in response to an instruction input via the operation unit 22. FIG. 6 is a flowchart of the operation of the controller 21 in the medley playback mode. On receiving the instruction of the medley playback, the controller 21 receives instruction of selecting songs to be played in step S1. Specifically, user looks for a desired song in a song book and inputs data such as a number or an alphabet specifying the desired song via the operation unit 22. Alternately, user may select a desired song from a list of songs represented on the TV monitor. Then, the controller 21 successively stores the selected songs until the termination of the input is instructed in step S2. Then, the controller 21 reads out playback information of an opening portion in step S3. Details of the playback information of the opening portion and the ending portion will be described later. Subsequently, the controller 21 searches and detects playback information of the selected songs and beginning and ending status of highlight portion, reads out detected playback information of the highlight portion, and arranges them in an order of selection to follow playback information of the opening portion in step S4. When the search of the highlight portions of the selected songs are completed in step S5, playback information of the ending portion is read out and arranged in step S6, to follow the playback information of the selected songs that has been already arranged. Thus playback information of one medley karaoke song is produced. Subsequently, MIDI sound source control information is transmitted to the MIDI sound source 23 and playback control of the medley karaoke song is performed in step S7. Simultaneously, the LD player 14 and the lighting device 16 are controlled in accordance with the image/lighting control information. In addition, the superimposer 25 is controlled in accordance with the word-of-song data to display titles of songs and word-of-song on the TV monitor 15.

Figure 7:
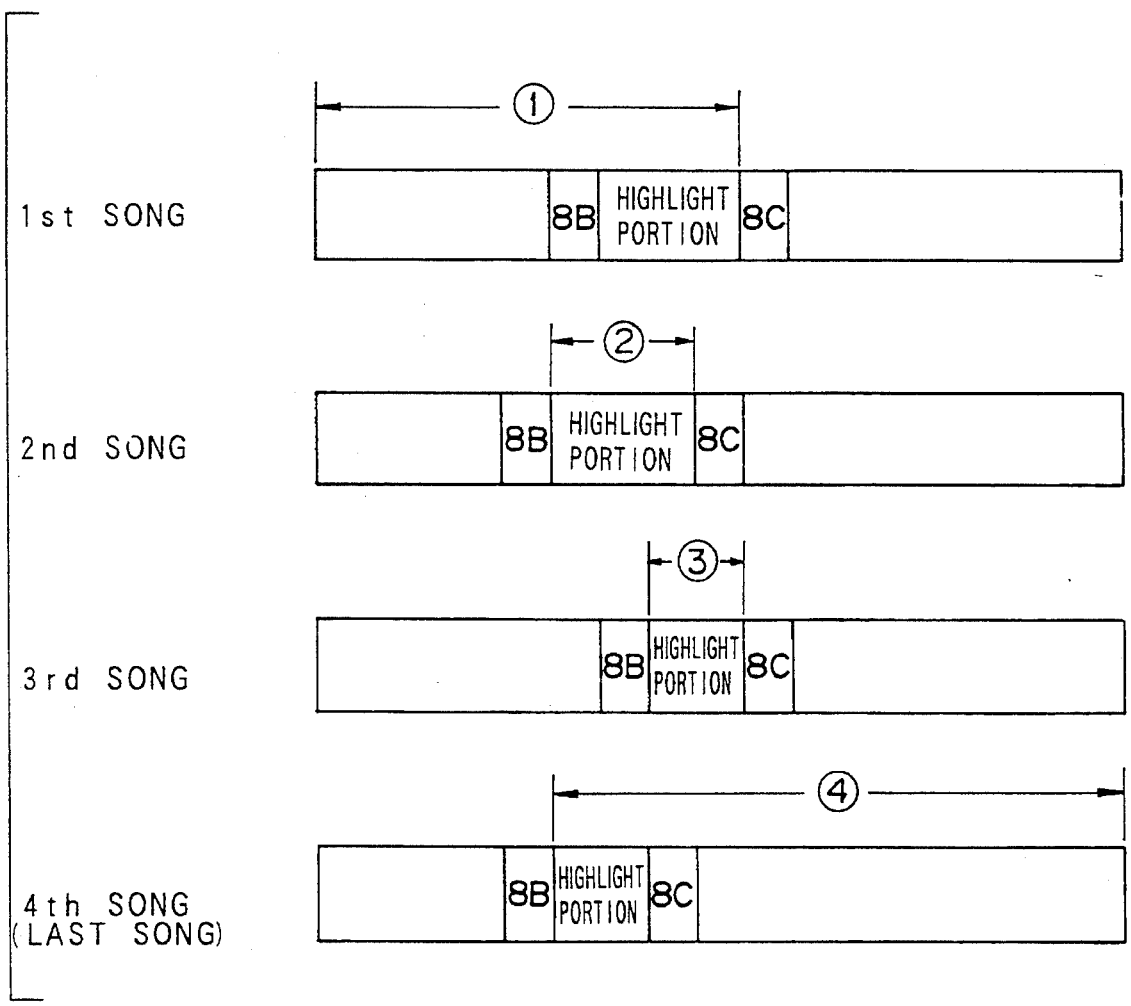
FIG. 7 is a diagram showing a playback manner of opening and ending of medley playback.
Figure 8:
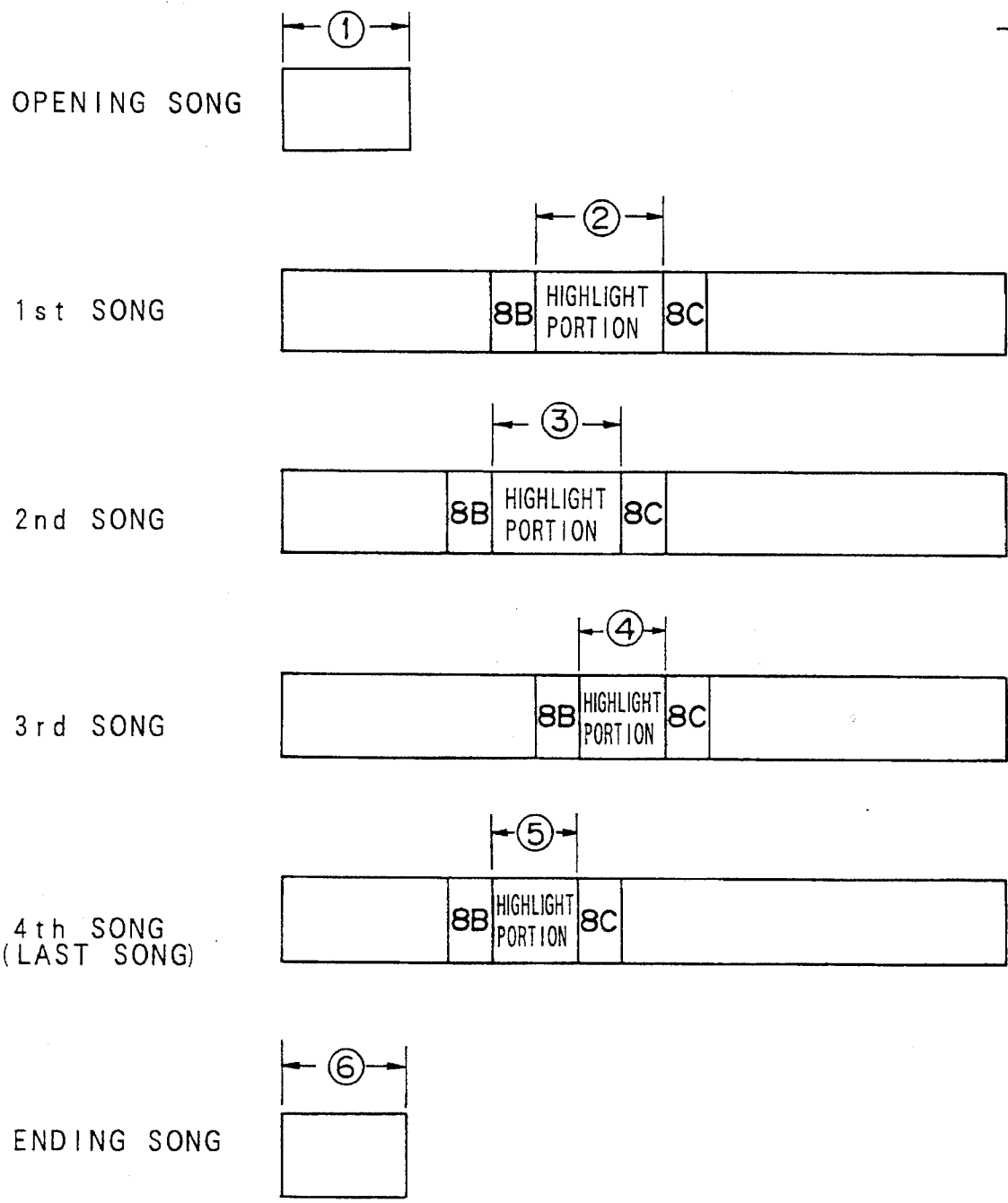
FIG. 8 is a diagram showing another playback manner of opening and ending of medley playback.
Figure 9:
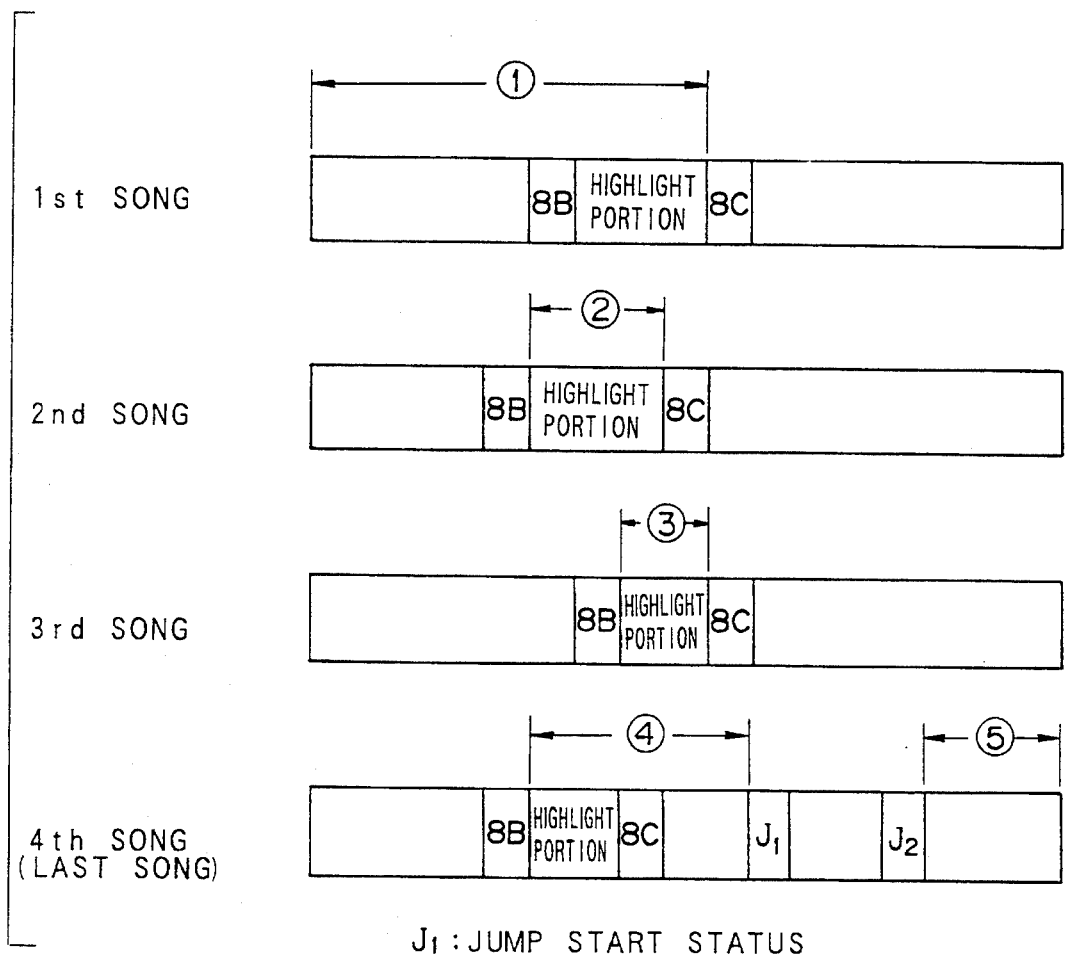
FIG. 9 is a diagram showing still another playback manner of opening and ending of medley playback.

FIGS. 7 to 9 show three playback patterns of opening and ending portions of medley karaoke song. These figures show the cases in which four songs are arranged to form one medley song, however, it is possible to arrange more songs in the same manner. FIG. 7 shows a first pattern in which a portion of a first song from the beginning thereof to the highlight portion thereof is used as the opening portion and a portion of a last song from the highlight portion thereof to the end thereof is used as the ending portion. That is, the portions of the songs are played in the order of ① to ④. FIG. 8 shows a second pattern in which music of the opening portion and ending portion are predetermined in advance irrespective of the selected songs, and stored in the storage unit. The music of the opening portion and the ending portion are read out and played with the highlight portions of the selected songs in the order of ① to ⑥. FIG. 9 shows a third pattern in which jump start status and jump end status are arranged in playback information of the songs. The playback manner is similar to that of the first pattern. Assuming that the last song consists of an opening part, first to third chorus parts and an ending part as shown in FIG. 9 and that the jump start status is positioned after the first or second chorus part and the jump end status is positioned before the ending part, the playback is performed in the order of ① to ⑤, thereby reducing the playback time. This kind of playback is described in U.S. patent application Ser. No. 775,147. According to the third pattern, if the jump start status is positioned after the highlight portion of the song, playback information of the portion from the highlight portion to the jump start status and playback information after the jump end status are read out. Therefore, according to the third pattern, the first pattern is used in the opening portion and the ending portion is shortened. It is possible to utilize the second pattern in the opening portion and utilize the third pattern in the ending portion. That is, the first to third patterns can be mixed.

Figure 10A:
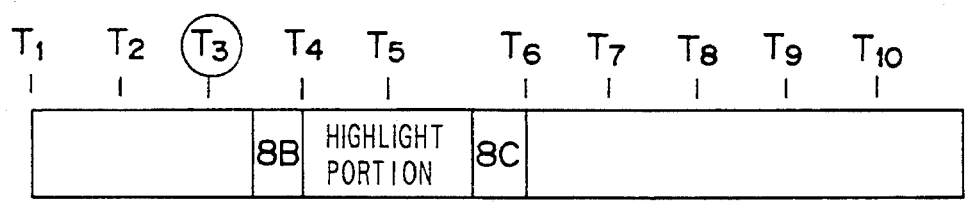
FIG. 10A is a diagram showing format of background image control data or lighting control data.

Next, controls of background image, lighting and title display will be described below. Now assuming that the image control data and lighting control data are arranged in correspondence with the playback information of the songs as indicated by $T_1$ to $T_{10}$ shown in FIG. 10A, image/lighting control data corresponding to the portion to be played will be used in the similar manner as playback information. That is, if only the highlight portion of playback information is played, the image control data and lighting control data of the highlight portion ($T_4$ and $T_5$) is played. In a case of using the second pattern shown in FIG. 8 to play the opening portion, the control is performed from the data positioned before and nearest to the highlight portion of the first song ($T_3$ in FIG. 10A). With respect to the lighting control data, a plurality of data are sometimes used simultaneously, and the number of the lighting device is not limited to one. Therefore, the lighting control data is prepared to meet various objects or to correspond to a plurality of lighting devices.

Figure 10B:
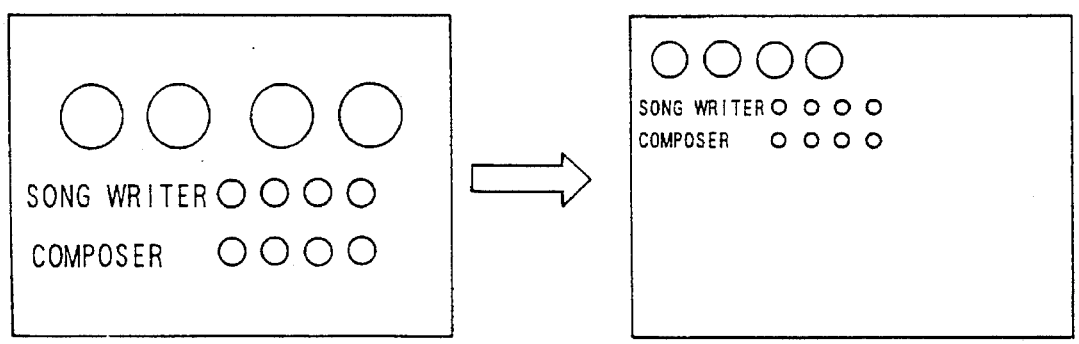
FIG. 10B is a diagram showing a manner of displaying titles of songs.

With respect to the display of title, control data is prepared for displaying the title on the center of the TV monitor in a large size in the normal playback mode, as shown in FIG. 10B. In the medley playback mode, the title is displayed on the center of the TV monitor in the manner shown in the left side of FIG. 10B at the playback time of the first song, and the titles of the songs after the first song are displayed in such a manner that the size of them are reduced and display positions of them are arranged, as shown in the right side of FIG. 10B. The control data indicating displaying timing of the title are altered at the same time when data of the highlight portions of the selected songs are arranged to produce the playback information of the medley karaoke information.

The above described embodiment is directed to the case of successively reading out the playback information of the highlight portions and producing the playback information of the medley karaoke song before the playback thereof. However, the reading of the playback information of the highlight portions and playback thereof can be performed in parallel. By this operation, waiting time can be reduced especially in a case where many songs are selected. Further, the above embodiment is directed to the case where status of the MIDI sound source control information serving as the identification information of the highlight portion is inserted in the playback information of the songs and the playback information of the highlight portions are obtained with reference to the identification information. However, it is possible to store the playback information of the highlight portions with identification information separately from the playback information of the songs, and read them out. Further, the above embodiment is directed to the case that the status indicating the highlight portion is inserted in a predetermined position of the song in advance. However, it is possible to provide a unit for designate the position of the highlight portions to insert the status at the desired positions of the song. Still further, it is possible to apply the functions of fade-in and fade-out at the borders of the respective highlight portions arranged successively.

As described above, the karaoke apparatus according to the present invention stores playback information including MIDI sound source control information for controlling the MIDI sound source with the identification information for specifying highlight portions of the songs, and reads out the playback information of the selected songs. Therefore, it is possible for users to easily produce his or her favorite medley karaoke song and the karaoke play will become more enjoyable.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A karaoke apparatus for medley playback comprising:

playback unit for receiving playback information including MIDI sound source control information and producing acoustic sound of karaoke song on the basis of the playback information;

information storage unit for the storing playback information and identification information of a plurality of karaoke songs, said identification information specifying the playback information of a highlight portion of each of the plurality of karaoke songs;

selection instructing unit for instructing a selection of karaoke songs to be played; and playback control unit for reading out the playback information of the highlight portions of the songs selected by the selection instructing unit from said information storage unit on the basis of the identification information of the each of the selected karaoke songs, and controlling said playback unit to successively play the selected karaoke songs on the basis of the playback information of the selected karaoke songs to produce a medley of the selected karaoke songs.

2. An apparatus according to claim 1, wherein said identification information is inserted in the playback information to partition a predetermined portion of the playback information.

3. An apparatus according to claim 2, wherein said identification information comprises beginning status and ending status.

4. An apparatus according to claim 1, further comprising a unit for setting the identification information to determine the position of the highlight portion.

5. An apparatus according to claim 1, wherein said playback control unit comprises memory unit for storing the playback information of the selected songs in an order of the selection thereof as medley playback information, and controls said playback unit to play the medley karaoke song on the basis of the stored medley playback information.

6. An apparatus according to claim 1, wherein said playback control unit controls said playback unit to play first song of the selected songs from the beginning of the song to the highlight portion thereof and play last song of the selected songs from the highlight portion thereof to the end of the song.

7. An apparatus according to claim 1, wherein said playback control unit controls said playback unit to play predetermined opening music before playing the selected songs and play predetermined ending music after playing the selected songs.

8. An apparatus according to claim 1, further comprising image display unit for displaying images corresponding to the highlight portions of the selected karaoke songs simultaneous with the playback of the karaoke songs.

9. An apparatus according to claim 8, wherein said image comprises characters of word-of-song of the karaoke songs.

10. An apparatus according to claim 1, further comprising lighting unit for performing lighting control in accordance with the medley playback.

11. A karaoke apparatus for medley playback comprising:

information storage unit for storing digital music data including song data of a plurality of karaoke songs, each of the song data including music data and identification data specifying a highlight portion of the music data;

selection instruction unit for instructing selection of karaoke songs to be played;

medley karaoke data generation unit for reading out the identification data of the songs selected by the selection instruction unit from said information storage unit in an order of the selection of the songs and combining the music data of the highlight portions of the selected songs each specified by the identification data to produce a successive music data of the selected songs;

medley karaoke data storage unit for storing the successive music data of the selected songs as a medley karaoke data; and playback unit for receiving the medley karaoke data and producing acoustic sound of karaoke song on the basis of the medley karaoke data.

12. An apparatus according to claim 11, wherein said digital music data comprises display data and word-of-song data, said apparatus further comprising character generation unit for generating characters of word-of-songs on the basis of the word-of-song data and display unit for displaying information relating to the karaoke songs on the basis of the display data and characters of word-of-songs generated by the character generation unit.

13. An apparatus according to claim 11, wherein said identification data comprises a beginning position data for specifying a beginning position of the highlight portion and an ending position data specifying an ending position of the highlight portion.

14. An apparatus according to claim 11, wherein said medley karaoke data generation unit produces a successive music data of the selected songs so that music data of a first song of the selected songs are combined from the beginning of the song to the highlight portion thereof and music data of a last song of the selected songs are combined from the highlight portion thereof to the end of the song.

15. An apparatus according to claim 11, wherein said medley karaoke data generation unit produces a successive music data of the selected songs so that data of a predetermined opening music is arranged preceding to the music data of the selected songs and data of a predetermined ending music is arranged to follow the music data of the selected songs.

16. A method of medley playback of karaoke songs using an omnibus karaoke apparatus comprising the steps of:

storing digital music data including song data of a plurality of karaoke songs, each of the song data including music data and identification data specifying a highlight portion of the music data;

instructing a selection of karaoke songs to be played in medley;

reading out the music data of highlight portions of the selected songs with reference to the identification data;

combining the music data of the highlight portions read out to form a successive music data of the selected songs;

storing the successive music data of the selected songs as a medley karaoke data; and producing acoustic sound of karaoke song on the basis of the medley karaoke data.

17. A method according to claim 16, further comprising the steps of generating characters of word-of-songs on the basis of a word-of-song data and displaying information relating to the karaoke songs on the basis of a display data and characters of word-of-songs generated.

* * * * *